United States Patent
Li et al.

(10) Patent No.: US 12,527,549 B2
(45) Date of Patent: Jan. 20, 2026

(54) COMPOUND METHOD OF SHEAR-WAVE ELASTOGRAPHY AND QUASI-STATIC ELASTOGRAPHY

(71) Applicant: Shantou Institute of Ultrasonic Instruments Co., Ltd., Shantou (CN)

(72) Inventors: Delai Li, Shantou (CN); Liexiang Fan, Shantou (CN); Yu Wang, Shantou (CN); Bin Li, Shantou (CN); Zhonghong Wu, Shantou (CN); Haomiao Qiu, Shantou (CN); Zhongyun Wei, Shantou (CN); Zehang Cai, Shantou (CN); Yuqiang Kang, Shantou (CN); Peifeng Chen, Shantou (CN)

(73) Assignee: Shantou Institute of Ultrasonic Instruments Co., Ltd., Shantou (CN)

( * ) Notice: Subject to any disclaimer, the term of this patent is extended or adjusted under 35 U.S.C. 154(b) by 45 days.

(21) Appl. No.: 18/746,593

(22) Filed: Jun. 18, 2024

(65) Prior Publication Data

US 2024/0382178 A1 Nov. 21, 2024

Related U.S. Application Data

(63) Continuation of application No. PCT/CN2023/094921, filed on May 18, 2023.

(30) Foreign Application Priority Data

May 17, 2023 (CN) .......................... 202310555889.9

(51) Int. Cl.
*A61B 8/00* (2006.01)
(52) U.S. Cl.
CPC ............ *A61B 8/485* (2013.01); *A61B 8/5207* (2013.01); *A61B 8/58* (2013.01)

(58) Field of Classification Search
CPC ......... A61B 8/485; A61B 8/5207; A61B 8/58; A61B 8/5223; G01S 7/52042
See application file for complete search history.

(56) References Cited

U.S. PATENT DOCUMENTS

| | | | | |
|---|---|---|---|---|
| 2011/0172565 A1* | 7/2011 | Shih | ................. | A61B 8/085 600/587 |
| 2011/0270079 A1* | 11/2011 | Osman | ................. | A61B 5/702 600/421 |

(Continued)

FOREIGN PATENT DOCUMENTS

| | | | | |
|---|---|---|---|---|
| CN | 104203115 A | * | 12/2014 | ............ A61B 8/085 |
| CN | 105678703 A | * | 6/2016 | ........... G06T 3/4038 |

(Continued)

OTHER PUBLICATIONS

English translation of the Internation Search Report for related application WO 2024/234355 (Year: 2024).*

(Continued)

*Primary Examiner* — Pascal M Bui Pho
*Assistant Examiner* — Taylor Deutsch
(74) *Attorney, Agent, or Firm* — Westbridge IP LLC

(57) ABSTRACT

Disclosed is a compound method of shear-wave elastography (SWE) and quasi-static elastography (QSE). The method includes: firstly, pre-scanning is carried out on a target region to obtain a rough comparison relation curve, then real-time scanning is carried out. The rough comparison relation curve is optimized and corrected to obtain an accurate comparison relation curve. Finally, the real-time shear modulus of a large area is calculated according to the real-time elastic relative value of the large area, so that accurate real-time elastography is realized.

2 Claims, 2 Drawing Sheets

(56) References Cited

U.S. PATENT DOCUMENTS

| | | | |
|---|---|---|---|
| 2018/0042480 A1* | 2/2018 | Liu | A61B 5/0066 |
| 2021/0022715 A1* | 1/2021 | Brattain | G16H 50/50 |
| 2021/0145608 A1* | 5/2021 | Herr | A61B 8/0825 |
| 2023/0157671 A1* | 5/2023 | Li | B06B 3/00 |
| | | | 600/438 |
| 2023/0380796 A1* | 11/2023 | Chen | A61B 8/485 |

FOREIGN PATENT DOCUMENTS

| | | | | | |
|---|---|---|---|---|---|
| CN | 105877783 A | * | 8/2016 | | |
| CN | 106373166 B | * | 6/2019 | | A61B 8/485 |
| WO | WO-2021001426 A1 | * | 1/2021 | | A61B 8/485 |

OTHER PUBLICATIONS

Machine-generated English translation of CN-106373166-B (Year: 2025).*

Machine-generated English translation of CN-105678703-A (Year: 2025).*

Machine-generated English translation of CN-105877783-A (Year: 2025).*

Machine-generated English translation of CN-104203115-A (Year: 2025).*

Abstract: Seo, M., et al. "Comparison and Combination of Strain and Shear Wave Elastography of Breast Masses for Differentiation of Benign and Malignant Lesions by Quantitative Assessment: Preliminary Study." Journal of Ultrasound in Medicine, vol. 37, Issue 1, Jan. 2018, p. 99-109. (Year: 2018).*

* cited by examiner

COMPOUND METHOD OF SHEAR-WAVE ELASTOGRAPHY AND QUASI-STATIC ELASTOGRAPHY

CROSS-REFERENCE TO RELATED APPLICATIONS

The present application is a continuation application of International Application No. PCT/CN2023/094921, filed on May 18, 2023, which claims priority to Chinese Patent Application No. 202310555889.9, filed on May 17, 2023. All of the aforementioned applications are incorporated herein by reference in their entireties.

TECHNICAL FIELD

The application relates to the field of ultrasonic imaging, in particular to a compound method of shear-wave elastography (SWE) and quasi-static elastography (QSE).

BACKGROUND

Elastography is an essential method for diagnosing breast, thyroid or liver lesions by applying static or dynamic compression to the tissues according to different hardness characteristics of lesion tissues and surrounding tissues, thereby indirectly or directly obtaining elastic modulus and other related information of tissues by using ultrasonic imaging methods.

Based on mechanical excitation modes, the existing elastography methods are mainly divided into two categories: quasi-static elastography and shear-wave elastography.

The quasi-static elastography method is only a reflection of the elastic modulus of tissues before and after stress, which is a relative value that cannot qualitatively calculate the elastic modulus of tissues, and the imaging effect is greatly affected by factors such as the operator's personal experience and the force of compression with low repeatability.

Although the measurement results of point shear-wave elastography (pSWE) are shear modulus and the measurement results are reliable and reproducible, the measurable areas are very small, and the clinical diagnosis is restricted. The large imaging area of 2D shear-wave elastography (2D-SWE), with high number of excitation and hardware constraints, will result in slow shear-wave elastography imaging speed and low frame rate.

SUMMARY

The application aims to provide a compound method of shear-wave elastography (SWE) and quasi-static elastography (QSE), thereby to achieve the effects of large imaging regions, high frame rates and true elastographic results.

In order to achieve the objective above, the follow technical solution is adopted: a compound method of shear-wave elastography and quasi-static elastography comprising the following steps:

S01, pre-scanning a subject by performing two-dimensional shear-wave imaging on a target region of the subject to obtain a true shear modulus of the tissue in the target region as a benchmark, then performing quasi-static imaging and calculating an elastic relative value of the target region tissue by utilizing the quasi-static imaging result, segmenting the target region into a plurality of sub-regions and coding the sub-regions, and combining the imaging values of the target region from the two scans to obtain a rough comparison curve of shear modulus and elastic relative values in each sub-region of the target region tissue of the subject;

S02, performing a formal real-time scan on the subject. Performing quasi-static imaging by applying a compression force with a fixed frequency fluctuation to the subject through a probe, and leaving a blank time period in which the force is zero between two adjacent compressions; Transmitting shear waves from the probe to perform point shear-wave elastography during the blank time period, so as to obtain real-time relative values of elasticity of a large region tissue and shear modulus of a small region tissue of the exam part respectively;

S03, using the real-time relative values of elasticity of the large region tissue and the shear modulus of the small region tissue of the subject region obtained in step S02, performing real-time optimization and correction on the rough comparison curve of the shear modulus and the relative elastic value of the tissue in the target region of the subject obtained in step S01, so as to obtain an accurate comparison curve of the real-time shear modulus and the relative elastic value of the exam part; and S04, taking the relative elastic value of the tissue in the large region obtained in step S02 as input, and calculating the shear modulus of the large region by using the accurate comparison curve between the shear modulus and the relative elastic value obtained in step S03, so as to realize accurate elastography of the large region.

Specifically, using an electric propulsion device to drive the probe back and forth when performing quasi-static imaging in steps S01 and S02, so as to apply a compression force with a fixed frequency to the exam part from the probe.

The application has the beneficial effects to perform compound imaging by adopting two elastography modes: shear-wave elastography and quasi-static elastography, with an aim to achieving the imaging of large imaging regions, high frame rates and accurate shear modulus measurement structures, which improves the quality and efficiency of elastography effectively and is convenient for doctors to operate and perform rapid diagnosis; Furthermore, an electric propulsion device is adopted to drive the probe, so that the stability of the compression applied to the exam part when the probe performs quasi-static imaging is improved, which facilitates doctors' operation and reduces errors caused by artificial compression.

DETAILED DESCRIPTION OF THE EMBODIMENTS

Figure 1:
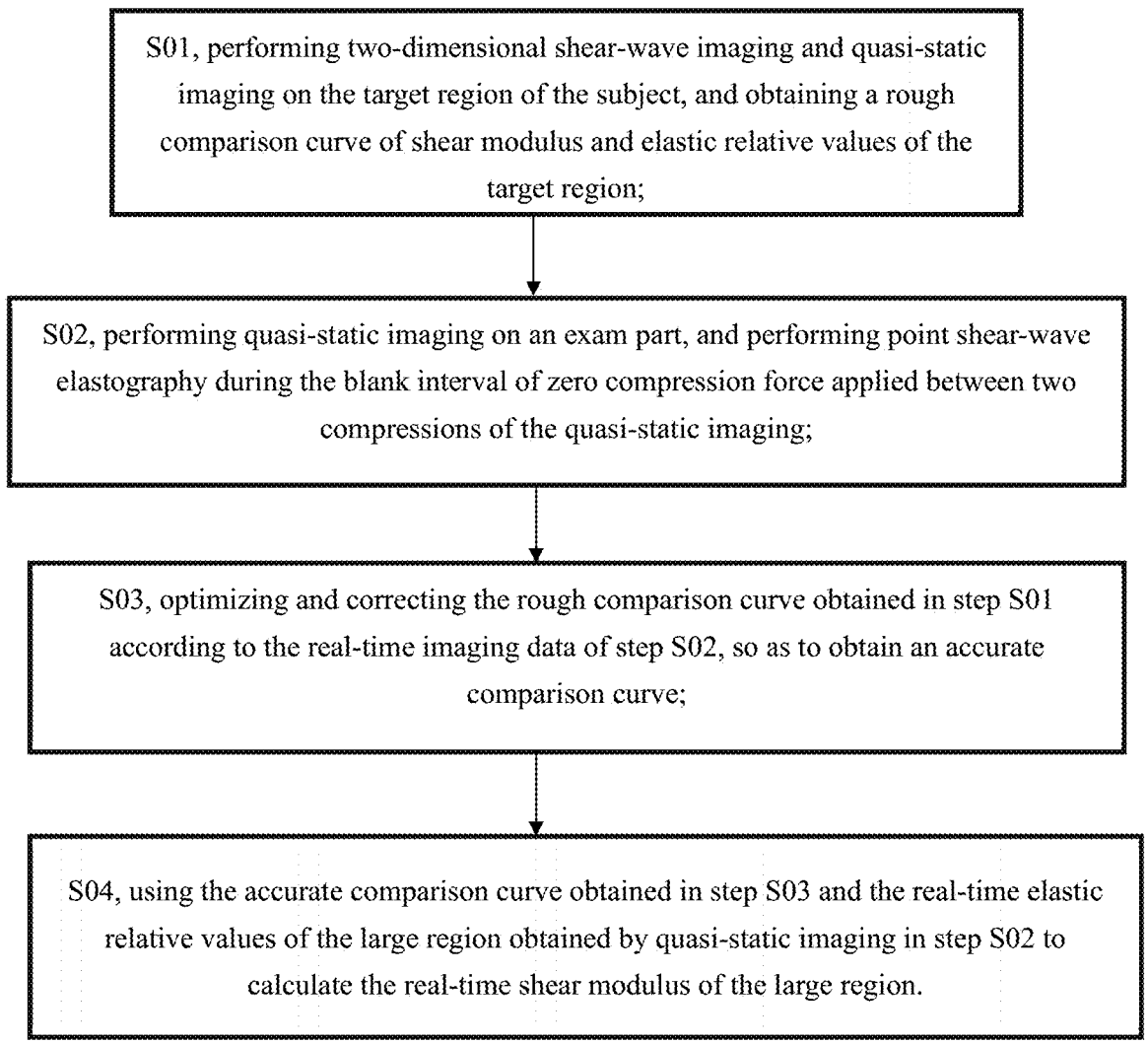
FIG. 1 illustrates a flow chart of a compound method of shear-wave elastography and quasi-static elastography in an embodiment.
Figure 2:
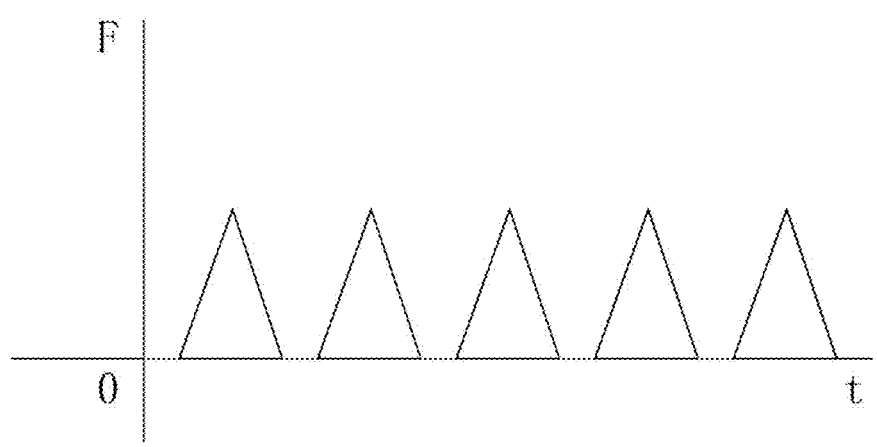
FIG. 2 illustrates the compression applied by the probe to the exam part changing with time in step S02 of the embodiment.

Embodiment 1, referring to FIGS. 1-2, is a compound method of shear-wave elastography and quasi-static elastography comprising the following steps:

S01, pre-scanning a subject by performing two-dimensional shear-wave imaging on a target region of the subject to obtain a true shear modulus of the tissue in the target region as a benchmark, then performing quasi-static imaging and calculating an elastic relative value of the target region tissue by utilizing the quasi-static imaging result, segmenting the target region into a plurality of sub-regions and coding the sub-regions, and combining the imaging values of the target region from the two scans to obtain a rough comparison curve of shear modulus and elastic relative values in each sub-region of the target region tissue of the subject. By segmenting the target region into a plurality of sub-regions and coding the sub-regions, a one-to-one correspondence relationship is established between the shear modulus and the elastic relative value of each sub-region. The shear modulus and the elastic relative values from the one-to-one correspondence are sorted according to the coding of each sub-region, based on which curve fitting can be performed on the shear modulus and the elastic relative values having the one-to-one correspondence, so as to obtain a rough comparison curve of the shear modulus and the elastic relative values in each sub-region. It is also convenient for subsequent calculation of the real-time shear modulus of each sub-region and quickly determine its location;

S02, performing a formal real-time scan on the subject. Performing quasi-static imaging by applying a compression force with a fixed frequency fluctuation to the subject through a probe, and leaving a blank time period in which the force is zero between two adjacent compressions; Transmitting shear waves from the probe to perform point shear-wave elastography during the blank time period, so as to obtain real-time relative values of elasticity of a large region tissue and shear modulus of a small region tissue of the exam part respectively. FIG. 2 illustrates a graph showing the compression force applied by the probe to the exam part changes with time, wherein the blank time period is for zero force. When performing quasi-static imaging, the fixed frequency fluctuation that the compression force applies to the exam part refers to keeping the frequency of the force applied to the exam part stable. Due to different operation habits of doctors when performing quasi-static imaging and different exam parts, the frequencies of the compression force are not the same. The fluctuation of force at the fixed frequency can be adjusted regularly according to the operation requirements of doctors, and the force can also be adjusted according to actual needs;

S03, using the real-time relative values of elasticity of the large region tissue and the shear modulus of the small region tissue of the subject region obtained in step S02, performing real-time optimization and correction on the rough comparison curve of the shear modulus and the relative elastic value of the tissue in the target region of the subject obtained in step S01, so as to obtain an accurate comparison curve of the real-time shear modulus and the relative elastic value of the exam part; During real-time scanning, the imaging region is small due to point shear-wave elastography. Therefore the real-time shear modulus obtained by point shear-wave elastography and the real-time elastic relative values obtained during quasi-static imaging of the sub-regions where the imaging is located are added to the data obtained from pre-scanning in step S01, the curve fitting is performed again to obtain a more accurate comparison curve. The precision comparison curve is more accurate and the obtained imaging results are more accurate after the real-time scanning lasts for a period of time; and S04, taking the relative elastic value of the tissue in the large region obtained in step S02 as input, and calculating the shear modulus of the large region by using the accurate comparison curve between the shear modulus and the relative elastic value obtained in step S03, so as to realize accurate elastography of the large region.

Specifically, when quasi-static imaging is performed in step S01 and step S02, the electric propulsion device is used to drive the probe back and forth, so that the probe applies a compression force of a fixed frequency to the exam part. The electric propulsion device can be an electric push rod, and the electric propulsion device drives the probe to and fro by connecting with a handle of the probe; meanwhile, in order to conveniently control the compression exerted by the probe on the exam part, a compression sensor can be installed between the electric propulsion device and the probe, and the compression exerted by the probe on the detected part can be detected through the compression sensor. In this way, the electric propulsion device is controlled to drive the probe to press down to control the compression force.

Certainly the embodiments above are preferred for the present application only, but not intended to restrict the scope of use of the present application. Therefore, any equivalent changes made on the principles of the present application should be included in the protection scope of the present application.

What is claimed is:

1. A compound method of shear-wave elastography and quasi-static elastography, comprising:
    step S01, pre-scanning a subject by performing two-dimensional shear-wave imaging on a target region of the subject to obtain a true shear modulus of a tissue in the target region as a benchmark, then performing quasi-static imaging and calculating an elastic relative value of the target region tissue by utilizing the quasi-static imaging result, segmenting the target region into a plurality of sub-regions and coding the plurality of sub-regions, and combining the true shear modulus and the elastic relative value of the target region to obtain a rough comparison curve of the true shear modulus and the elastic relative value in each of the plurality of sub-regions of the target region tissue of the subject;
    step S02, performing a formal real-time scan on the subject, performing quasi-static imaging by applying a compression force with a fixed frequency fluctuation to the subject through a probe, and leaving a blank time period in which the compression force is zero between two adjacent compressions; transmitting shear waves from the probe to perform point shear-wave elastography during the blank time period, so as to obtain a real-time elastic relative value of a large region tissue and a real-time shear modulus of a small region tissue of the target region respectively;
    step S03, using the real-time elastic relative value of the large region tissue and the real-time shear modulus of the small region tissue of the target region obtained in the step S02, performing real-time optimization and correction on the rough comparison curve of the true shear modulus and the elastic relative value of the tissue in the target region of the subject obtained in the step S01, so as to obtain an accurate comparison curve of the real-time shear modulus and the real-time elastic relative value of the target region; and step S04, taking the real-time elastic relative value of the tissue in the large region tissue obtained in the step S02 as input, and calculating a new shear modulus of the large region tissue by using the accurate comparison curve between the real-time shear modulus and the real-time elastic relative value obtained in the step S03, so as to realize accurate elastography of the large region tissue.

2. The compound method of shear-wave elastography and quasi-static elastography according to claim 1, wherein an electric propulsion device is used to drive the probe back and forth when performing the quasi-static imaging in the steps S01 and S02, so as to apply the compression force with the fixed frequency fluctuation to the target region from the probe.

* * * * *